(12) United States Patent
DeMarco (10) Patent No.: US 10,033,489 B1
(45) Date of Patent: Jul. 24, 2018

(54) MANAGING COMMUNICATIONS BASED ON NETWORK CONDITIONS

(71) Applicant: Amazon Technologies, Inc., Seattle, WA (US)

(72) Inventor: Paul Derek DeMarco, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 770 days.

(21) Appl. No.: 14/579,147

(22) Filed: Dec. 22, 2014

(51) Int. Cl.
*H04W 4/00* (2018.01)
*H04L 1/18* (2006.01)
*H04L 29/08* (2006.01)
*H04L 29/06* (2006.01)
*H04L 12/26* (2006.01)

(52) U.S. Cl.
CPC ........... *H04L 1/188* (2013.01); *H04L 1/1896* (2013.01); *H04L 43/08* (2013.01); *H04L 67/10* (2013.01); *H04L 69/16* (2013.01)

(58) Field of Classification Search
CPC ............................. H04L 12/56; H04L 12/26
USPC .......................... 370/235–339; 709/230–246
See application file for complete search history.

(56) References Cited

U.S. PATENT DOCUMENTS

| | | | | |
|---|---|---|---|---|
| 2012/0300663 | A1* | 11/2012 | Lu ......................... | H04L 1/1671 370/252 |
| 2013/0124752 | A1* | 5/2013 | Griffith ............... | G06F 11/3006 709/235 |
| 2014/0204794 | A1* | 7/2014 | El-Najjar .............. | H04W 16/18 370/254 |

OTHER PUBLICATIONS

Author Unknown, "TCP/IP Overview—Cisco," Available at: http://www.cisco.com/c/en/us/support/docs/ip/routing-information-protocol-rip/13769-5.html, 9 pages (printed Nov. 19, 2014).
Kim, "Understanding TCP/IP Network Stack & Writing Network Apps," Available at: http://www.cubrid.org/blog/dev-platform/understanding-tcp-ip-network-stack/, 25 pages (printed Nov. 20, 2014).
Parziale, "TCP/IP Tutorial and Technical Overview," IBM Redbooks, 8th Edition (Dec. 2006), also available at: http://ibm.com/redbooks, (Dec. 2006).
Paxson, et al., "RFC 6298—Computing TCP's Retransmission Time," Available at: http://tools.ietf.org/html/rfc6298, 22 pages (Jun. 2011).

* cited by examiner

Primary Examiner — Iqbal Zaidi
(74) Attorney, Agent, or Firm — K&L Gates LLP (57) ABSTRACT

Various examples are directed to optimizing communications based on network conditions. A computing device may be programmed to receive from a process executing at the computing device a network transmission request. The network transmission request may indicate payload data and a recipient computing device. The computing device may transmit to a recipient computing device a plurality of data packets. Each of the plurality of data packets may comprise at least a portion of the payload data. The computing device may detect an improvement in network conditions and accelerate retransmission of at least one data packet.

18 Claims, 10 Drawing Sheets

MANAGING COMMUNICATIONS BASED ON NETWORK CONDITIONS

BACKGROUND

Virtually all data traffic on the Internet is organized according to a protocol stack, such as the Open Systems Interconnection (OSI) suite or the Internet Protocol Suite, also called TCP/IP (TCP and IP refer to two different protocols of the suite, Transmission Control Protocol and Internet Protocol.) Protocol stacks are implemented by computing devices that communicate on a network. Each protocol is a separately abstracted tool that performs a particular task in either transmitting or receiving network communications. For example, application layer processes send data to transport layer protocols. Transport layer protocols break the data into segments and direct the segments to a network layer protocol. The network layer protocol converts the segments into data packets and sends the data packets to a hardware layer, such as Ethernet, WiFi or other wireless Local Area Network (WLAN), cellular, etc., for transmission.

Some transport layer protocols, such as TCP also handle error checking and transmission verification. Recipient computing devices provide an acknowledgment or ACK message when a data packet is received. TCP monitors data packets sent and corresponding acknowledgements received. If the transport layer protocol does not receive an acknowledgement for a data packet within a retransmission time-out threshold or RTO, it causes that data packet to be retransmitted to the recipient.

The TCP protocol dynamically sets the time-out threshold based on historical delays in data packet transmission. The TCP protocol sets and resets the retransmission timeout based on different factors. For example, TCP measures the round-trip time or RTT for each data packet transmitted. The RTT is the time between the transmission of a data packet and the receipt of an acknowledgement indicating that the data packet was received. TCP increases the retransmission time-out threshold if RTT increases or if a data packet or data packets must be retransmitted (e.g., if an acknowledgement is not received before the expiration of the existing retransmission timeout threshold). This can prevent unneeded retransmissions.

DETAILED DESCRIPTION

In the following description, reference is made to the accompanying drawings which illustrate several examples of the present invention. It is understood that other examples may be utilized and various operational changes may be made without departing from the spirit and scope of the present disclosure. The following detailed description is not to be taken in a limiting sense, and the scope of the examples of the present invention is defined only by the claims of the issued patent.

The systems and methods herein are directed to managing data packet retransmissions based on network conditions, such as local network conditions. Common transmission verification schemes, such as the Transmission Control Protocol (TCP), set retransmission time-outs for transmitted data packets based on historical round trip times (RTTs) or loss events. Although this may be acceptable for stationary computers on stable networks, it leads to inefficiencies in other circumstances. For example, many wireless networks, such as cellular networks and wireless local area networks (WLANs) provide different network conditions at different physical locations. If a computing device on a wireless network moves from an area of the network with poor connectivity to an area with better connectivity, it may take some time for to update the retransmission time-out. Accordingly, network communications at the computing device may be unnecessarily slow.

Various examples, described herein, modify data packet retransmissions directly or indirectly based on current network conditions. In some examples, the computing device is programmed to accelerate retransmissions when network conditions improve. Also, in some examples, processes executing on the computing device may be programmed to monitor network conditions and retransmit transmission requests if an improvement is detected.

Figure 1:
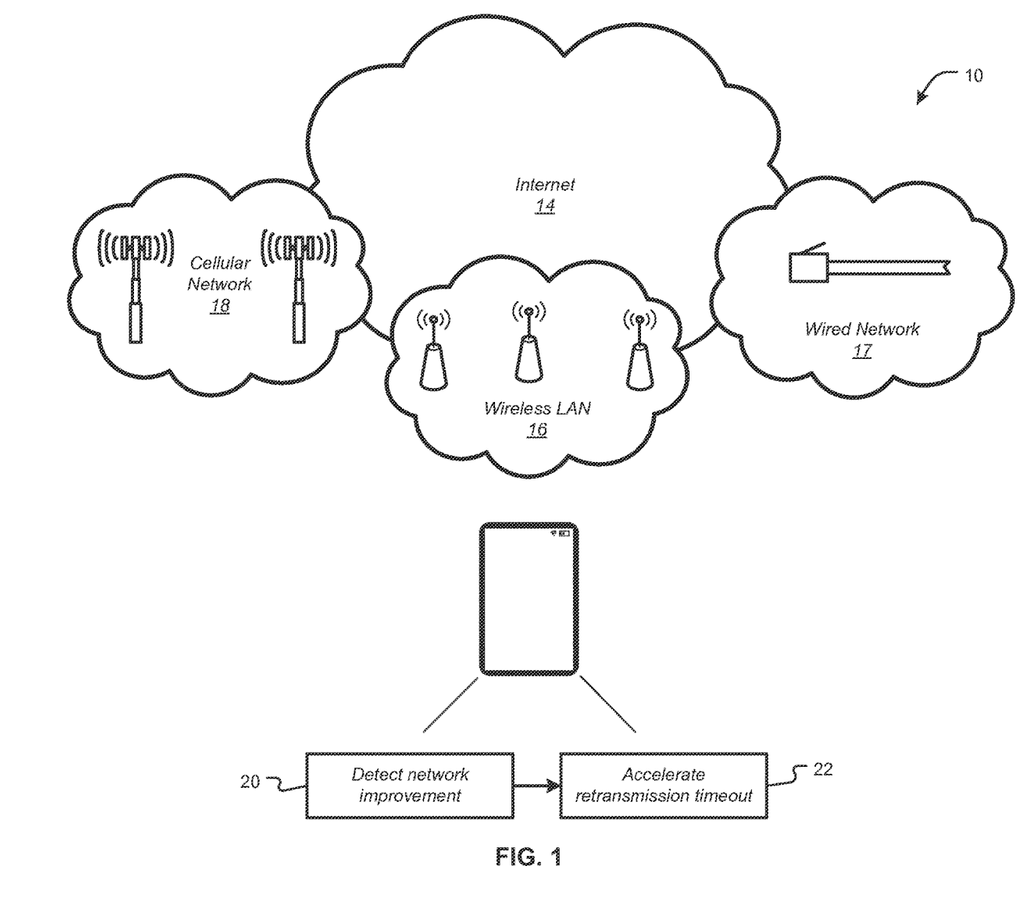
FIG. 1 is a diagram of an environment including a computing device configured to manage retransmission for network conditions.

FIG. 1 is a diagram of an environment 10 including a computing device 12 configured to manage retransmission for network conditions. The computing device 12 may be any suitable computing device such as, for example, a desktop computer, a laptop computer, a tablet computer, a mobile phone, etc. The computing device 12 may be configured to communicate on one or more networks such as, for example, the Internet 14. The computing device 12 may access the Internet 14 in any suitable manner. For example, the computing device 12 may access the Internet 12 via a cellular network 18, a wired connection 17 and/or via a Wireless Local Area Network or WLAN 16. The cellular network 18 may be any suitable type of cellular network. In some examples, the cellular network 18 may also be directly or indirectly in communication with a public switched telephone network to facilitate voice calls. The wired connection 17 may be any suitable type of wired connection including, for example, an Ethernet connection. The WLAN 16 may be any suitable type of wireless network organized according to the IEEE 802.11 specification or any other wireless specification.

During network usage, network conditions available to the computing device 12 may change. For example, wireless networks such as the WLAN 16 and/or the cellular network 18 may provide different levels of signal strength at different physical locations. Therefore, as the computing device 12 is moved to and from various physical locations, the network speed and latency may change with signal strength. In some examples, the computing device 12 transitions from the cellular network 18 to the WLAN 16 or vice versa, where one network 16, 18 or the other 16, 18 may be faster and/or have a lower latency. The computing device 12 may be programmed to detect an improvement in network conditions (20). The improvement may be an improvement in network speed, an improvement in network latency, or any other suitable characteristic tending to reduce the RTT of data packets transmitted by the computing device 12. When an improvement is detected, the computing device 12 may accelerate retransmission for pending data packets (22). The improvement may be detected in any suitable manner. In some examples, the computing device 12 may detect an improvement in network conditions by detecting an increase in signal strength from a wireless network, such as the WLAN 16 or the cellular network 18. Accelerating retransmission may comprise retransmitting one or more pending data packets, updating a retransmission timeout, etc. Accelerating retransmission in this way may allow the computing device 12 to take advantage of improved network conditions soon after those conditions occur.

Figure 2:
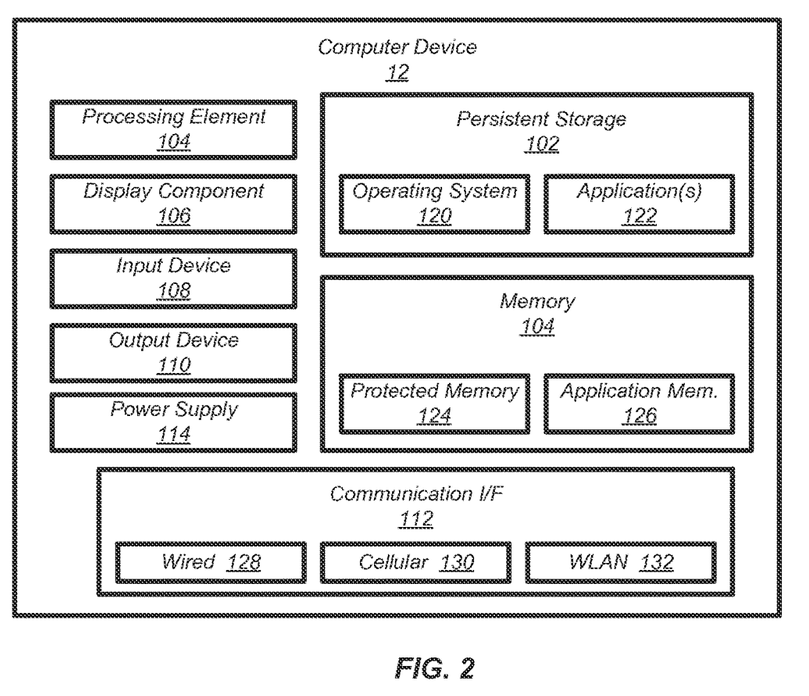
FIG. 2 is a block diagram showing an example hardware configuration of a computing device.

Before providing additional examples of managing retransmission, descriptions are given herein of an example hardware and an example architecture configuration for a computing device 12. FIG. 2 is a block diagram showing an example hardware configuration of a computing device 12. The computing device 12 may include a display component 106. The display component 106 may comprise, for example, one or more devices such as cathode ray tubes (CRTs), liquid crystal display (LCD) screens, gas plasma-based flat panel displays, LCD projectors, or other types of display devices, etc. The computing device 12 may also include one or more input devices 108. The input devices 108 can include, for example, a push button, touch pad, touch screen, wheel, joystick, keyboard, mouse, trackball, keypad, accelerometer, light gun, game controller, or any other such device or element whereby a user can provide inputs to the computing device 12. These input devices 108 may be incorporated into the computing device 12 or operably coupled to the computing device 12 via wired or wireless interface. For computing devices with touch-sensitive displays, the input devices 108 can include a touch sensor that operates in conjunction with the display component 106 to permit users to interact with the image displayed by the display component 106 using touch inputs (e.g., with a finger or stylus).

The computing device 12 may also include at least one communication interface 112. The communication interface 112 may comprise one or more communications modules configured to permit the computing device 12 to communicate on different types of networks, such as 16, 17, and 18 described above. For example, a wired communication module 128 may comprise one or more components operable to communicate on a wired network, such as the wired network 17. For example, the wired communication module 128 may comprise a network interface card (NIC) or any other suitable hardware. A cellular module 130 may comprise one or more components operable to communicate on a cellular network, such as the cellular network 18. Example components of the cellular module 130 may include a transceiver, a subscriber identity module (SIM) card, etc. A WLAN module 132 may comprise one or more components operable to communicate on a WLAN network such as the WLAN network 16 described above. For example, the WLAN module 132 may comprise a WLAN transceiver. In some examples, the communication interface 112 may also comprise additional components operable to communicate according to various other wired and/or wireless protocols such as, for example, Bluetooth, an IrDA-compliant protocol, or other infrared communications protocols. The computing device 12 may also include a power supply 114, such as a wired alternating current (AC) converter, a rechargeable battery operable to be recharged through conventional plug-in approaches, or through other approaches such as capacitive charging.

The computing device 12 also includes one or more processing elements 104 for executing instructions and retrieving data stored in one or both of a persistent storage element 102 or a memory element 104. The persistent storage element 102 can include one or more different types of storage such as, for example, solid state storage, disk-based storage, removable storage for transferring data to other devices, etc. Memory 104 may comprise any suitable form of Random Access Memory (RAM) or other suitable memory. For example, data stored at memory 104 may be accessible to the processing element 104 at a faster access time as compared to data stored at persistent storage 102.

Persistent storage 102 may store software for execution by the processing element 104 such as the operating system 120 and one or more applications 122. When an application is executed, all or part of the object code for executing the application may be loaded to the memory 104. In some examples, memory 104 is divided into at least two areas, protected memory 124 and application memory 126. Protected memory 124 may be accessible only by the operating system 120 and/or a kernel thereof. Application memory 126 may be generally accessible. Access to memory, and maintenance of divisions therein, may be managed by the operating system 120.

Figure 3:
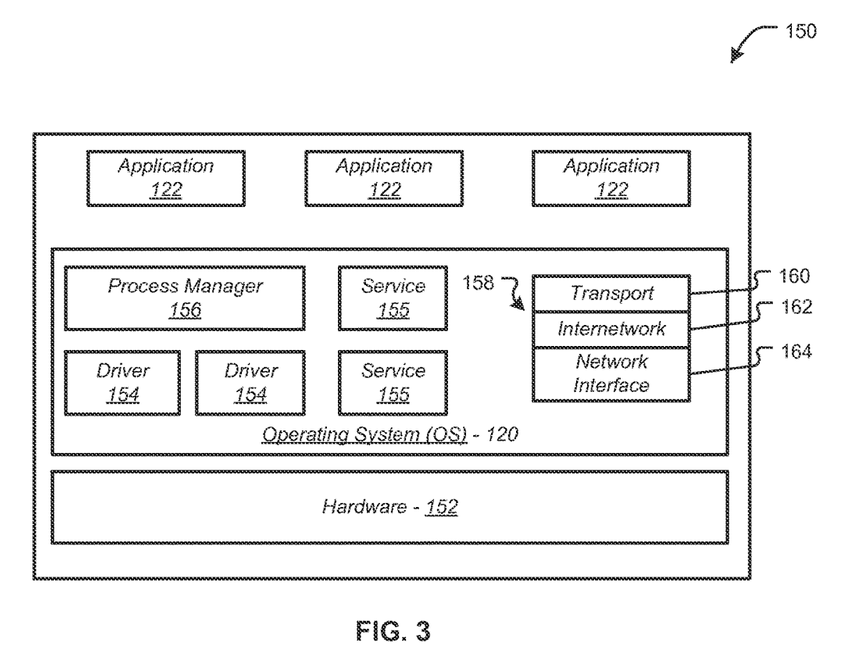
FIG. 3 is a diagram showing one example of an architecture configuration of the computing device.

FIG. 3 is a diagram showing one example of an architecture configuration 150 of the computing device 12. Applications 122 may interface with hardware 152 via the operating system 120. Each application 122 may comprise one or more processes executed by the processing element 104. For example, the operating system 120 may manage execution of the processes. The hardware 152 may comprise the hardware components described herein above with respect to FIG. 2. The operating system 120 may be any suitable operating system including, for example, any MICROSOFT WINDOWS operating system available from MICROSOFT CORPORATION, OS, iOS or any other suitable operating system available from APPLE, INC., ANDROID or any other suitable operating system available from GOOGLE, the FIRE OS available from AMAZON.COM, INC., etc.

The operating system 120 may comprise various components in various different configurations. Some examples of the operating system 120 comprise a process management element 156, various hardware drivers 154, various services 155. The process management element 156 may be configured to communicate with active applications 122 to manage processes, allocate resources (e.g., memory and other hardware) and also enable communication with and between the applications 122. Services 155 may be called by applications 122, for example, through the process manager 156.

The network protocol stack 158, in some examples, is called like a service by applications 122 to transmit and/or receive data utilizing the communication interface 112 and its associated hardware described above. The network protocol stack 158 may comprise various protocols for converting data to a format for network transmission. For example, a transport layer 160 protocol, such as Universal Datagram Protocol (UDP) or TCP may manage end-to-end communication by (i) breaking data into segments for transmission and, (ii) using the internetwork layer 162 protocol and network interface layer 164, transmitting resulting data packets to the recipient computing device. In some examples, described herein, the transport layer 160 also performs error checking and transmission verification. The internetwork layer 162 protocol may be any suitable protocol including, for example, Internet Protocol (IP). The internetwork layer 162 may receive data segments from the transport layer 160, add additional address information to the segments to generate data packets, and pass the data packets to the network interface layer 164. The network interface layer 164 may, for example, include the drivers 154 for the appropriate network hardware (e.g., communications interface 112). It will be appreciated that some network protocol stack implementations may have more or fewer layers than the example stack 158 described herein and/or may operate in different ways.

Figure 4:
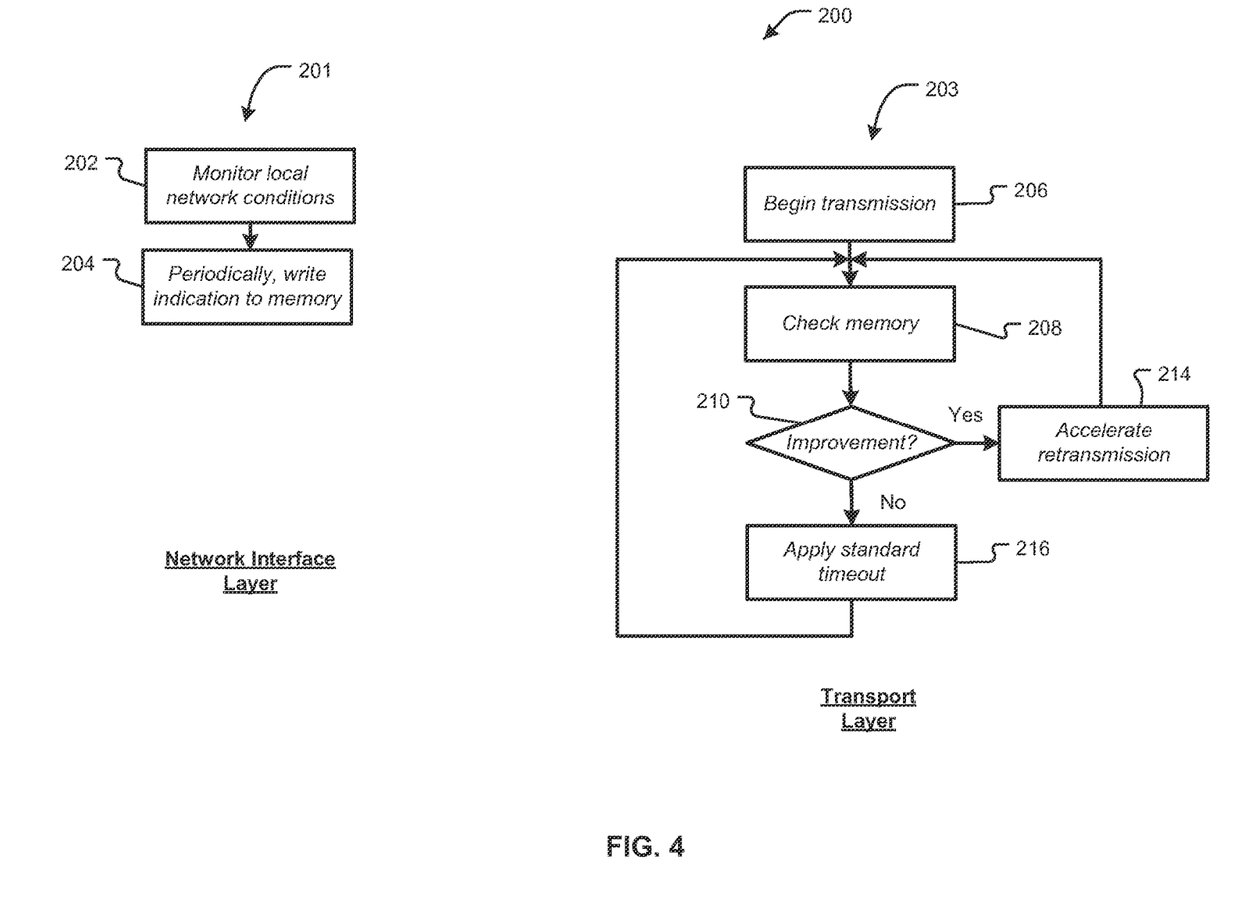
FIG. 4 is a flow chart showing one example of a process flow that may be executed by the computing device to manage retransmission time-outs.

Transmission verification may be handled by a transmission verification component that is not in direct communication with the hardware layer. For example, according to a network protocol stack, such as OSI or TCP/IP, the transport layer 160 is not in direct communication with hardware 152 or the network interface layer 164. Accordingly, the transport layer 160 is not aware of current network conditions. Various examples described herein manage retransmission by allowing the transport layer 160 to communicate with the network interface layer 164 to learn current network conditions. FIG. 4 is a flow chart showing one example of a process flow 200 that may be executed by the computing device 12 to manage retransmission. In the process flow 200, column 201 includes actions that may be performed by the network interface layer 164 while column 203 includes actions that may be performed by the transport layer 160 or other transmission verification component. Referring to column 201, the network interface layer 164 may be programmed to monitor network conditions at 202. For example, the network interface layer 164 may interface with network hardware and may, therefore, have access to indicators of current network conditions (e.g., network conditions at or near the current time).

Any suitable indicator of current network conditions may be used. For example, when communications are being transmitted on a cellular network 18 or WLAN network 16, signal strength may be an indicator of network conditions. Signal strength may be measured in any suitable manner including, for example, in decibels (dBs). Another example indicator of network conditions is the frequency of data collisions, which may indicate network congestion. The computing device 12 may detect data collisions using error correction codes or any other suitable method. For example, data collisions may be detected and error frequency codes applied at the hardware layer 152. A high frequency of collisions may indicate congested or poor network conditions. A lower frequency of collisions may indicate less-congested or better network conditions. In some examples, the indicator of current network conditions may comprise a current network location of the computing device 12. The current network location may be used in conjunction with data describing historical network conditions for or within a given network (e.g. cellular network 18, wireless LAN 16) or particular locations there. For example, the computing device 12 may maintain data describing the historical network conditions when communicating with a particular cellular tower of a cellular network 18 or wireless access point (WAP) of a wireless LAN 16.

At 204, the network interface layer 164 may periodically write the indicator of current network conditions to memory, for example, to protected memory 124. The transport layer 160 or other transmission verification component may retrieve and utilize the indicator as described herein. The network interface layer 164 may write the indicator to memory at any suitable interval. In some examples, the interval may take any value between about one microsecond to about ten seconds. In some examples, the interval may take any value between about 500 milliseconds and one second.

While the network interface layer 164 is performing the actions shown in column 201, the transport layer 160 or other transmission verification component, may execute actions shown in column 203. At 206, the transport layer 160 may begin a transmission. Beginning a transmission may involve receiving a request to transmit data via a network (e.g., a network transmission request) and any steps for processing the request. For example, the network transmission request may comprise payload data (e.g., data to be transmitted. Beginning a transmission may involve breaking payload data into segments and providing the segments to the internetwork layer 162 or equivalent layer for data packetizing and transmission. The internetwork layer 162 may format the data segments provided by the transport layer 160, for example, by adding routing data, such as an Internet Protocol (IP) header indicating the source and destination IP addresses. When the transport layer 160 comprises TCP or another protocol that handles transmission verification, beginning transmission may also comprise monitoring received acknowledgements and retransmitting segments/data packets that are not acknowledged within the retransmission time-out threshold.

At 208, the transport layer 160 may check memory for network conditions. For example, the transport layer 160 may check a location in memory 104 (e.g., a location in protected memory 124) where the network interface layer 164 stores the indicator of network conditions at 204. At 210, the transport layer 160 may determine if network conditions have improved by a threshold amount. The threshold amount may be any suitable amount indicating that the current retransmission time-out no longer accurately reflects network conditions. For example, when the network indicator is a signal strength, the threshold amount may be a doubling of single strength. In some examples, multiple indicators of current network conditions may be used to determine whether network conditions have improved. For example, the transport layer 160 may determine that signal strength is high when the computing device 12 is in close proximity to a network device such as a cellular tower or wireless access point. If the network device is highly congested, however, network conditions may not have actually improved. Accordingly, in some examples, the transport layer 160 may aggregate network condition indicators to determine if an improvement has occurred. For example, an increase in signal strength may be considered an improvement only if data collisions (or any other indicator of network congestion) have remained the same or decreased. Similarly, the detection of a network device associated with historically good network conditions may be considered an improvement only if signal strength and data collisions (or any other indicator of network congestion) have improved. In some examples, when the network layer 160 lacks two values to compare at 210 (e.g., after the first time the network layer 160 checks the memory at 208), it may conclude that no improvement has occurred. Also, in some examples, when the network layer 160 has checked the memory 208, it may use any suitable measurement as a baseline for measuring improvement including, for example, the first network condition indicator retrieved at 208, the most recent network indicator retrieved at 208, etc.

If no network improvement is detected at 210, the transport layer 160 may continue to apply the standard retransmission time-out at 216. If a network improvement is detected at 210, the transport layer 160 may accelerate retransmission at 214. Accelerating retransmission may be performed in any suitable manner. For example, the transport layer 160 may accelerate the retransmission of data packets sent under prior, slower network conditions and/or reduce the current length of the retransmission time-out by a predetermined amount (e.g., an amount based on the change in the network condition indicator). Also, in some examples, the transport layer 160 may accelerate retransmission in the manner described herein with respect to FIGS. 7 and 8. In some examples, the actions 208, 210 and 214 or 216 may be continually and/or periodically executed by the transport layer 160 throughout a data transmission. In this way, the transport layer 160 may be continually alert for improvements in network conditions. The actions may be repeated at any suitable interval. In some examples, the interval may take any value between about one microsecond to about ten seconds. In some examples, the interval may take any value between about 500 milliseconds and one second. Also, when transmission verification is performed by a transmission verification component other than the transport layer 160, that component may execute the actions 208, 210, and 214 or 216 to manage the retransmission time-out based on network conditions.

Figure 5:
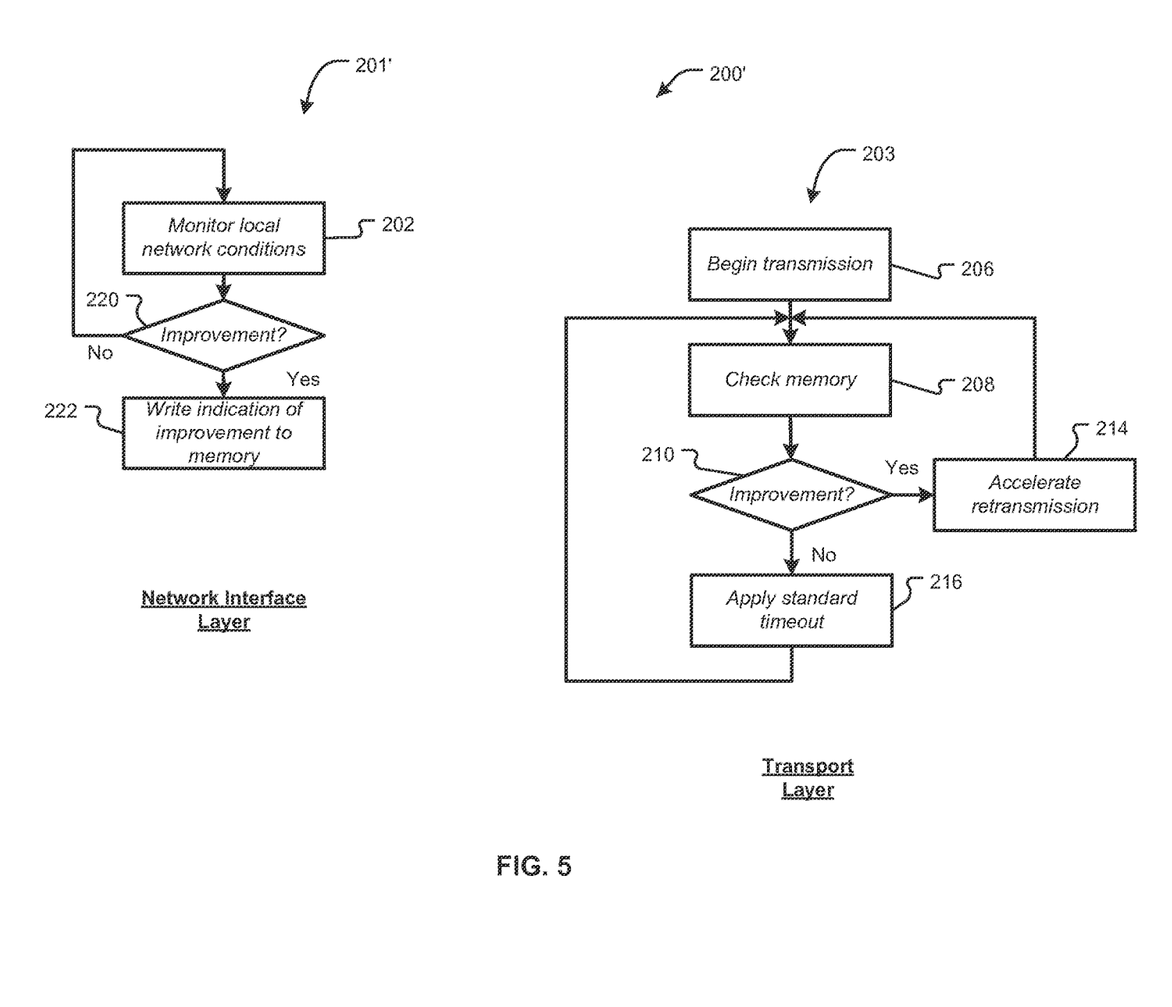
FIG. 5 is a flow chart showing another example of the process flow of FIG. 4.

FIG. 5 is a flow chart showing another example 200' of the process flow of FIG. 4. According to the process flow 200', the network interface layer 164 utilizes an alternative set of actions shown in column 201'. For example, after monitoring network conditions at 202, the network interface layer 164 may determine at 220 if there has been an improvement in network conditions at 220. The network interface layer 164 may determine an improvement in network conditions in any suitable manner including, for example, as described herein with respect to 210. If no improvement is detected at 220, the network interface layer 164 may continue to monitor network conditions at 202. If an improvement is detected at 220, the network interface layer 164 may, at 222, write an indication of the network condition and/or an indication that an improvement has been detected to memory 104 (e.g., protected memory 124). In the process flow 200', the transport layer 160 may operate similar to the description of FIG. 4. In some examples, however, at 210, the transport layer 160 may detect an improvement by determining whether the memory 104 comprises an indication of an improvement written at 222. In this way, improvement detection may be performed by one component (e.g., the network interface layer 142) instead of by both components.

Figure 6:
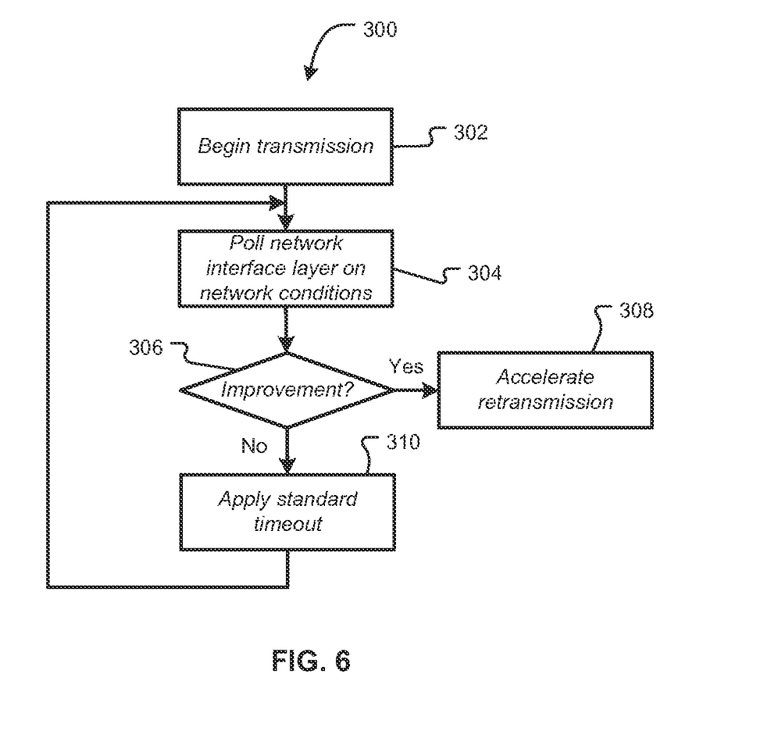
FIG. 6 is a flow chart showing another example of a process flow that may be executed by the computing device to manage retransmission time-outs.

FIG. 6 is a flow chart showing another example of a process flow 300 that may be executed by the computing device 12 to manage retransmission time-outs. For example, instead of having the network interface layer 162 actively measure and record network conditions, the process flow 300 involves the transport layer 140 polling the network interface layer 162. At 302, the transport layer 160 may begin a transmission, as described above with respect to 206. At 304, the transport layer 160 may poll the network interface layer 140 to receive network conditions. The transport layer 160 may poll the network interface layer 162 in any suitable manner. For example, the transport layer 160 may utilize a driver interface or application program interface (API) provided by one or more hardware components, such as a network interface card (NIC), wireless transceiver or other suitable networking hardware. At 306, the transport layer 160 may determine whether there has been an improvement in network conditions, for example, as described herein at 210. If an improvement is detected, the transport layer 160 may accelerate retransmission at 308. If no improvement is detected, the transport layer 160 may, at 310, continue to apply the standard retransmission time-out determined by TCP or another suitable component of the computing device 12 handling transmission verification. As illustrated, the transport layer 160 may periodically return to 304, re-poll the network interface layer 164 and continue with the remainder of the process flow 300. The transport layer 160 may re-poll the network interface layer 164 at any suitable interval. In some examples, the interval may take any value between about one microsecond to about ten seconds. In some examples, the interval may take any value between about 500 milliseconds and one second. Also, although the process flow 300 is described as being performed by the transport layer, some portions of the process flow 300 (e.g., 304, 306 and 308 or 310) may be performed by any other suitable component of the computing device 12 handling transmission verification.

Figure 7:
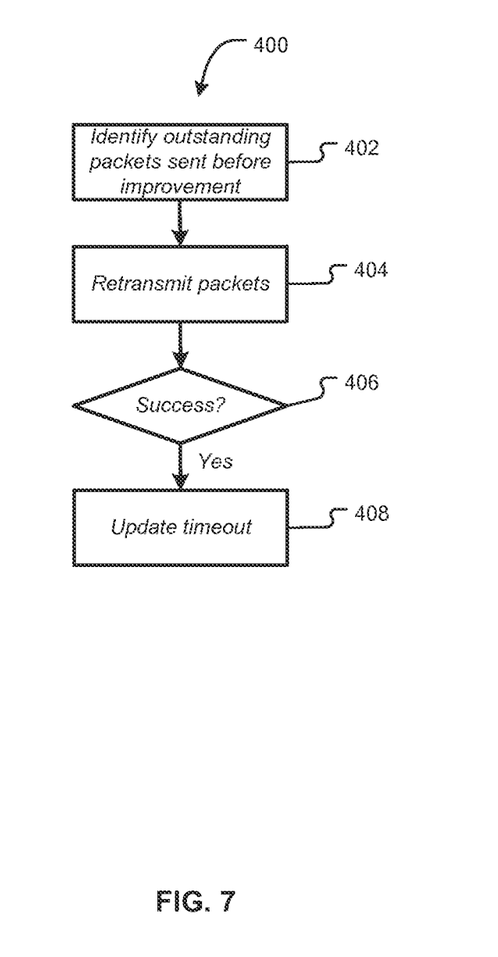
FIG. 7 is a flow chart showing one example of a process flow that may be executed by the computing device to accelerate retransmission.

As described herein with respect to the process flows 200, 200' and 300, under some circumstances (e.g., improvements to network conditions) the computing device 12 accelerates retransmission. FIG. 7 is a flow chart showing one example of a process flow 400 that may be executed by the computing device 12 (e.g., the transport layer 160 or other transmission verification component) to accelerate retransmission. At 402, the transport layer 160 may identify outstanding data packets sent before the improvement in network conditions. These may include data packets that were sent before the detected improvement in network conditions but have not yet received acknowledgements. Because these data packets were sent under the older, inferior network conditions, the fact they are not yet acknowledged is likely to be due to network conditions. Accordingly, waiting until the end of the original retransmission time-out may be wasteful, as these data packets may be quickly retransmitted under the improved network conditions. The timing of the improvement in network conditions may be determined in any suitable manner. For example, the transport layer 160 may note a time when an improvement is detected (e.g., at 210 or 306 above). The send time of each data packet may also be noted. At 404, the transport layer 160 may retransmit the outstanding data packets. In some examples, the transport layer 160 may retransmit the outstanding data packets in order from the first to last data packet to have been originally sent.

At 406, the transport layer 160 may determine whether the retransmission at 404 was successful. For example, the retransmission may be considered successful if a threshold number of the retransmitted data packets are acknowledges within a threshold time period. The threshold time period may be, for example, a percentage or portion of the current retransmission time-out value. If the retransmission is successful, the transport layer 160 may optionally update the retransmission time-out to a new value at 408. The newly updated retransmission time-out may apply to the computing device 12 in any manner. For example, the updated retransmission time-out may be applied to data packets from the transmission requests handled at 206, 302 and/or may also apply to new transmission requests made on the same socket or other sockets. For example, newly sent data packets may be monitored using the updated retransmission time-out. The updated value for the retransmission time-out may be determined in any suitable manner. For example, the new value for the retransmission time-out may be selected based on current network conditions (e.g., speed, latency, signal level) or based on observed round trip times (RTTs) from the data packets retransmitted at 404.

Figure 8:
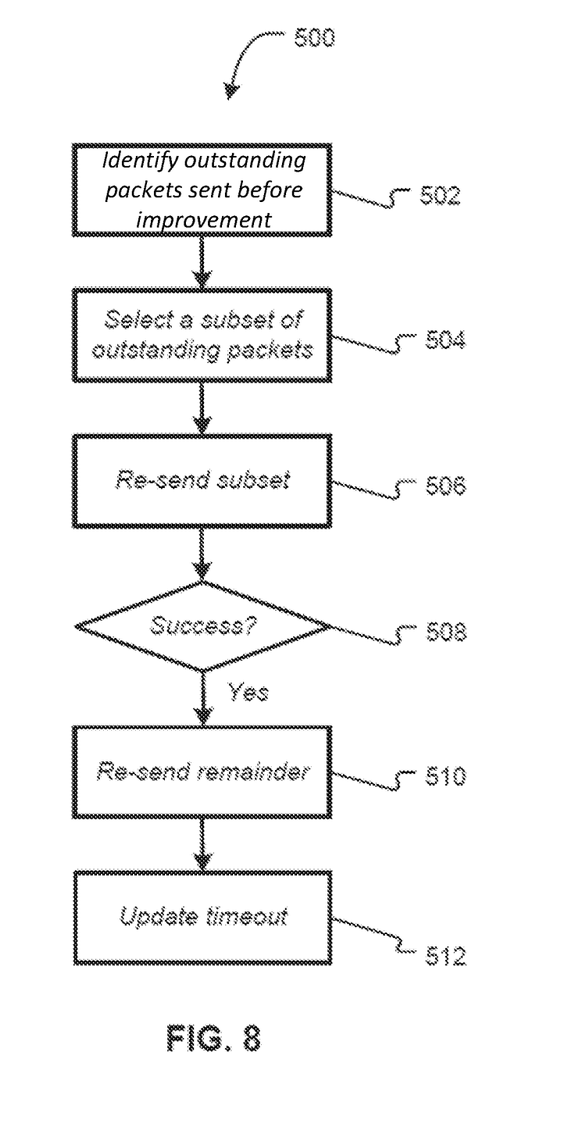
FIG. 8 is flow chart showing another example of a process flow that may be executed by the computing device to accelerate retransmission.

In some examples, some or all of the outstanding data packets sent before the network improvement may be outstanding due network delays other than local network conditions. For example, some or all of the data packets may be directed to recipient computing devices on local networks with low speeds or high latency. Accordingly, resending all of the outstanding data packets may not always be most efficient. FIG. 8 is flow chart showing another example of a process flow 500 that may be executed by the computing device 12 (e.g., the transport layer 160 or other transmission verification component) to accelerate retransmission.

At 502, the transport layer 160 may identify outstanding data packets sent before the detected improvement in network conditions, for example, as described herein at 402. At 504, the transport layer may select a subset of the data packets identified at 504. The subset may be selected in any suitable manner. For example, the transport layer 160 may select data packets that have been outstanding the longest, data packets that are most likely to be delayed due to network conditions before the detected improvement, etc. At 506, the transport layer may retransmit the subset of data packets. At 508, the transport layer 160 may determine if the retransmission was successful. A successful retransmission may be determined in any suitable manner. For example, a retransmission may be considered a success if a threshold portion of the retransmitted data packets are acknowledged within a threshold time period. The threshold time period may be, for example, a percentage or portion of the current retransmission timeout value. If the retransmission is successful, it may indicate that the outstanding data packets identified at 502 are likely to be outstanding because of local network conditions at the time of the original transmission and not because of other communication errors. Accordingly, at 510, the transport layer 160 may retransmit the remainder of the outstanding data packets at 504 (e.g., those that were not already retransmitted at 508). If the retransmission is successful, the transport layer 160 may, optionally, update the retransmission timeout value at 512. The retransmission timeout may be updated, for example, as described above with respect to 408.

Figure 9:
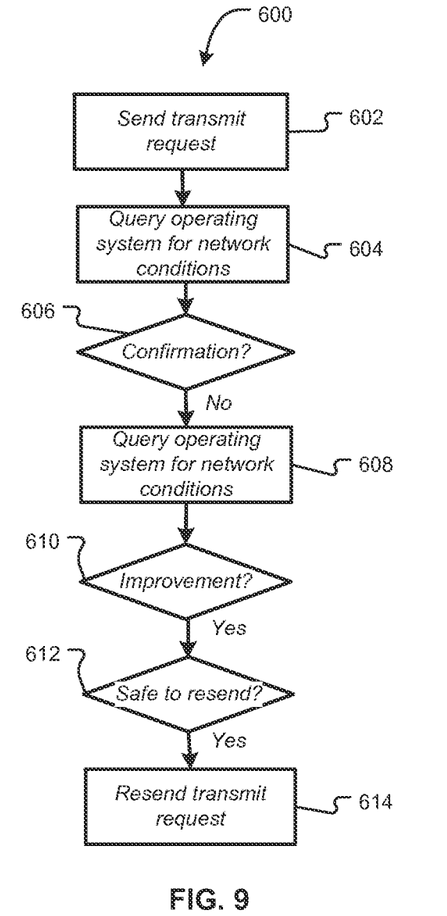
FIG. 9 is a flow chart showing one example of a process flow for optimizing retransmission time-outs for local network conditions at the application layer.

FIG. 9 is a flow chart showing one example of a process flow 600 for optimizing retransmission time-outs for network conditions at the application layer. For example, referring to FIG. 3, instead of optimizing the retransmission time-out at the transport layer 160, individual applications 122 may be programmed to retransmit previous transmit requests upon improvements to local network conditions. At 602, an application 122 may send a transmit request comprising data to be transmitted via one or more of the networks 16, 17,18. For example, the transmit request may be directed to the transport layer 160, which may handle the transmission as described herein (e.g., break the data into segments and send the segments as data packets using the internetwork layer 162). The application 122 may query the operating system 120 or other suitable source for network conditions. For example, the operating system 120 may maintain a service 153 that monitors network conditions, as described herein. The application 122 may query the relevant service 153 to obtain the local network conditions. In some examples, the application 122 may request the local network conditions concurrent with, shortly before, or shortly after sending the transmit request at 602. In this way, the application 122 may have an indication of local network conditions at or about the time that transmit request of 602 is sent.

At 606, the application 122 may determine whether a confirmation has been received (e.g., received within a threshold time such as, for example, one second). The protocol stack 158 may be configured to provide a confirmation to the application 122 when all data packets derived from the transmit request have been acknowledged by the recipient computing device. If a confirmation is received within the threshold time, the application 122 may continue its processing (e.g., it may discontinue executing the process flow 600).

If the confirmation is not received within the threshold time, the application 122 may, at 608, again query the operating system 120 for local network conditions at a second time (e.g., a time after the application 122 has determined that it has not received the confirmation). The application 122 may determine at 610 whether the current conditions represent an improvement in local network conditions relative to the conditions received at 604. In some examples, the improvement detected at 610 may be a connection to a new network. For example, the mobile device 12 may have moved from a cellular network 19 to, or added a connection to a faster WLAN network 16 or wired network 17.

If an improvement is detected, the application 122 may determine, at 612, whether it would be safe to retransmit the transmit request of 602. For example, retransmitting the transmit request creates a risk that the request will be received by the recipient computing device twice. If the transmit request is a POST request, double receipt might cause the content to be posted at the recipient computing device multiple times, which would be undesirable in many cases. Other types of transmit requests, such as GET commands or other requests, would not cause considerable harm if received twice. In some examples, certain kinds of transmit requests (e.g., GET commands) may be safe to retransmit while others (e.g., POST commands) may not. Any other suitable method may be used to identify transmit requests that are safe to retransmit. If the transmit request is not safe to retransmit, the application 122 may continue to await a response. If the transmit request is safe to retransmit, the application 122 may retransmit it request at 614. In this way, the transmit request may be serviced, by the appropriate protocol stack 158, under the new, improved network conditions. In some examples, when retransmitting the transmit request, the application 122 may also cancel the initial transmit request from 602.

Figure 10:
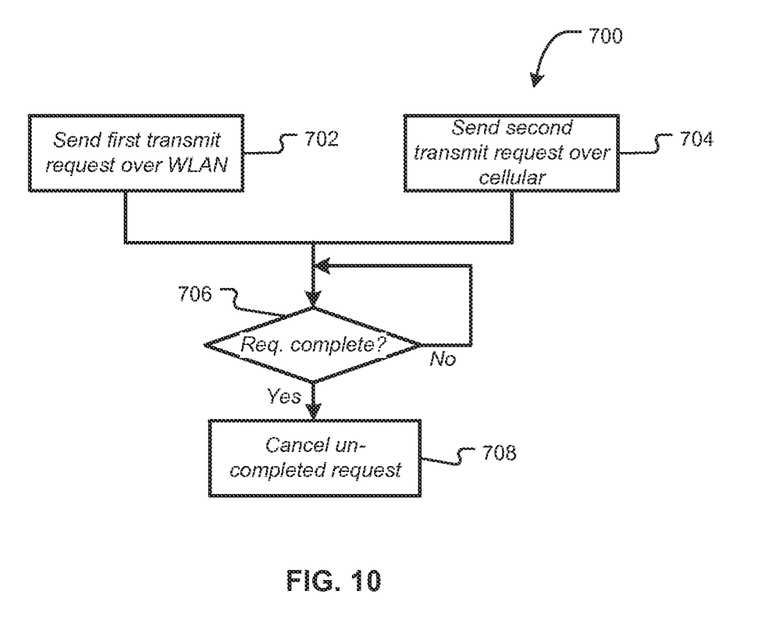
FIG. 10 is a flow chart showing another example of a process flow for optimizing retransmission time-outs for local network conditions at the application layer.

FIG. 10 is a flow chart showing another example of a process flow 700 for optimizing retransmission time-outs for local network conditions at the application layer. For example, the process flow 700 may be utilized in a client device 12 that is capable of maintaining two simultaneous network connections such as, for example, a connection to a cellular network 18 and a connection to a WLAN 16. At 702, an application 122 may send a first transmit request over the WLAN. At 704, the application 122 may send a second transmit request over the cellular network. The first and second transmit requests may be identical to one another. For example, they may both request transmission of the same payload data. At 706, the application 122 may determine whether either of the requests are complete. For example, the application may determine whether it has received a confirmation from an operating system 120 or other suitable component of the computing device 12 that either of the requests are complete. If not, the application 122 may continue to query whether the requests are completed. If one request or the other is completed at 706, the application 122 may cancel the uncompleted request at 708. In some examples, it may not always be possible to cancel the uncompleted request before it is completed. Accordingly, prior to sending the requests at 702 and 704, the application 122 may determine whether the requests could be safely received twice, for example, as described above with respect to 612.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some examples, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described examples of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computing device, the computing device comprising:
a wireless transceiver;
a memory; and
at least one processor, wherein the at least one processor is programmed to:
  execute a network interface layer protocol that is configured to:
    detect an improvement in network conditions; and
    write an indication of the improvement to the memory; and
  execute a Transmission Control Protocol (TCP) configured to:
    receive from an application executing at the computing device a network transmission request, wherein the network transmission request indicates payload data and a recipient computing device;
    format a plurality of data packets, wherein each of the plurality of data packets comprises a portion of the payload data;
    transmit a first data packet selected from the plurality of data packets to the recipient computing device using the wireless transceiver;
    determine the indication of the improvement in network conditions is stored at the memory;
    identify a set of data packets selected from the plurality of data packets, wherein the set of data packets were transmitted before the improvement in network conditions; and
    retransmit the set of data packets in an order in which the set of data packets were originally transmitted.

2. The computer device of claim 1, wherein the TCP is further configured to:
determine that retransmission of the set of data packets was successful; and
reduce a retransmission time-out threshold, wherein the retransmission time-out threshold is a time after transmitting a first data packet when the TCP causes the first data packet to be retransmitted when the computing device has not received an acknowledgement from the recipient computing device that the recipient computing device received the first data packet.

3. The computing device of claim 1, wherein the network interface layer protocol is further configured to:
  monitor network conditions; and
  periodically write an indication of network conditions to the memory.

4. A computing device, the computing device comprising:
  a wireless transceiver;
  a memory;
  at least one processor, wherein the at least one processor is programmed to:
    receive from a process executing at the computing device a network transmission request, wherein the network transmission request indicates payload data and a recipient computing device;
    transmit to the recipient computing device a plurality of data packets, wherein each of the plurality of data packets comprises at least a portion of the payload data;
    read from the memory an indication of at least one current network condition written to the memory by a network interface layer, wherein the at least one processor is programmed to execute the network interface layer, and the network interface layer is programmed to write the indication of the at least one current network condition to the memory;
    determine the at least one current network condition is improved relative to at least one past network condition; and
    accelerate a retransmission of at least one data packet selected from the plurality of data packets.

5. The computing device of claim 4, wherein the at least one current network condition comprises a signal strength on a wireless network.

6. The computing device of claim 4, wherein the wireless transceiver is selected from the group consisting of a wireless local area network (WLAN) transceiver and a cellular transceiver.

7. The computing device of claim 4, wherein the at least one processor is further programmed to detect an improvement in network conditions, wherein to accelerate the retransmission of the at least one data packet the at least one processor is further programmed to:
  identify a set of outstanding data packets selected from the plurality of data packets, wherein the set of outstanding data packets were transmitted by the computing device before the improvement in network conditions was detected; and
  retransmit the set of outstanding data packets to the recipient computing device.

8. The computing device of claim 7, wherein the at least one processor is further programmed to:
  determine the retransmission of the set of outstanding data packets was successful; and
  reduce a retransmission time-out threshold, wherein the retransmission time-out threshold is a time after transmitting a first data packet when a Transmission Control Protocol (TCP) causes the first data packet to be retransmitted when the computing device has not received an acknowledgement from the recipient computing device that the recipient computing device received the first data packet.

9. The computing device of claim 7, wherein the at least one processor is further programmed to: retransmit the set of outstanding data packets in order from a first data packet originally transmitted to a last data packet originally transmitted.

10. The computing device of 4, wherein the at least one processor is further programmed to:
  detect an improvement in network conditions;
  identify a set of outstanding data packets selected from the plurality of data packets, wherein the set of outstanding data packets were transmitted by the computing device before the improvement in network conditions was detected; and
  select a subset of the set of outstanding data packets;
  retransmit the subset of the set of outstanding data packets to the recipient computing device;
  determine retransmission of the subset was successful; and
  retransmit a remainder of the set of outstanding data packets to the recipient computing device.

11. The computing device of claim 10, wherein the at least one processor is further programmed to: determine an acknowledgement from the recipient computing device was received by a threshold portion of the subset of the set of outstanding data packets.

12. A computing device, the computing device comprising:
  a first wireless transceiver;
  a second wireless transceiver;
  a memory;
  at least one processor, wherein the at least one processor is programmed to:
    execute an operating system;
    execute an application, wherein the application is configured to:
      send a transmit request comprising data to be transmitted utilizing the first wireless transceiver;
      query the operating system for at least one network condition at a first time;
      determine the application has not received a confirmation of the transmit request within a threshold time;
      after determining the application has not received the confirmation of the transmit request within the threshold time, query the operating system for the at least one network condition at a second time;
      determine the at least one network condition at the second time indicates an improvement since the first time, wherein determining the at least one network condition at the second time indicates the improvement since the first time comprises determining that a connection has been established using the second wireless transceiver; and
      resend the transmit request for transmission using the second wireless transceiver.

13. The computing device of claim 12, wherein the at least one processor is further programmed to, before resending the transmit request, determine the transmit request can be safely resent.

14. A computing device, the computing device comprising:
  a cellular transceiver;
  a wireless local area network (WLAN) transceiver
  a memory;
  at least one processor, wherein the at least one processor is programmed to:
    execute an operating system;
    execute an application, wherein the application is configured to:
      send a first transmit request comprising payload data, wherein the first transmit request is to be transmitted utilizing the cellular transceiver;

send a second transmit request, prior to receipt of an acknowledgement message related to the first transmit request, wherein the second transmit request comprises the payload data, wherein the second transmit request is to be transmitted utilizing the WLAN transceiver;

determine the first transmit request is complete; and send a request to cancel the second transmit request.

15. The computing device of claim 14, wherein the at least one processor is further programmed to periodically determine whether a first confirmation of the first transmit request is received before a second confirmation of the second transmit request.

16. A computing device, the computing device comprising:

a wireless transceiver;

a memory;

at least one processor, wherein the at least one processor is programmed to:

receive from a process executing at the computing device a network transmission request, wherein the network transmission request indicates payload data and a recipient computing device;

transmit to the recipient computing device a plurality of data packets, wherein each of the plurality of data packets comprises at least a portion of the payload data;

detect an improvement in network conditions by:

polling a network interface layer to determine a signal strength of a wireless network; and determining the signal strength is improved relative to at least one previous signal strength; and accelerate a retransmission of at least one data packet selected from the plurality of data packets.

17. The computing device of claim 16, wherein to accelerate the retransmission of the at least one data packet the at least one processor is further programmed to:

identify a set of outstanding data packets selected from the plurality of data packets, wherein the set of outstanding data packets were transmitted by the computing device before the improvement in network conditions was detected; and retransmit the set of outstanding data packets to the recipient computing device.

18. The computing device of claim 16, wherein the at least one processor is programmed to execute the network interface layer, and wherein the network interface layer is programmed to provide an indication of the at least one current network condition in response to the polling the network interface layer by the at least one processor.

* * * * *